(12) United States Patent
Lee (10) Patent No.: US 8,233,357 B2
(45) Date of Patent: Jul. 31, 2012

(54) ENCODER CAPABLE OF COMPENSATING FOR TILT, HARD DISK DRIVE USING THE SAME, AND SERVO TRACK WRITING SYSTEM FOR THE HARD DISK DRIVE

(75) Inventor: Chul-woo Lee, Seongnam-si (KR)

(73) Assignee: Seagate Technology, Cupertino, CA (US)

( * ) Notice: Subject to any disclaimer, the term of this patent is extended or adjusted under 35 U.S.C. 154(b) by 112 days.

(21) Appl. No.: 12/816,411

(22) Filed: Jun. 16, 2010

(65) Prior Publication Data

US 2010/0315910 A1 Dec. 16, 2010

(30) Foreign Application Priority Data

Jun. 16, 2009 (KR) .................. 10-2009-0053491

(51) Int. Cl.
*G11B 11/00* (2006.01)

(52) U.S. Cl. ............ 369/13.11; 250/231.14; 250/214 C; 360/75

(58) Field of Classification Search ............... 369/13.11; 250/231.14, 214 C; 360/75
See application file for complete search history.

(56) References Cited

U.S. PATENT DOCUMENTS

| 6,731,454 | B2 * | 5/2004 | Sri-Jayantha et al. ..... 360/78.12 |
|---|---|---|---|
| 7,027,196 | B2 * | 4/2006 | Kim ................................. 359/15 |
| 7,050,259 | B1 | 5/2006 | Guo et al. |
| 7,332,709 | B2 * | 2/2008 | Imai ......................... 250/231.14 |
| 7,348,546 | B2 * | 3/2008 | Schoser et al. ........... 250/231.13 |
| 7,377,435 | B2 * | 5/2008 | Wei ............................... 235/454 |
| 7,470,892 | B2 * | 12/2008 | Ohmura et al. ........... 250/237 G |
| 7,943,897 | B2 * | 5/2011 | Okada ...................... 250/231.13 |
| 2002/0114099 | A1 | 8/2002 | Nakayama |
| 2005/0023450 | A1 * | 2/2005 | Ito ............................. 250/231.13 |
| 2005/0201226 | A1 * | 9/2005 | Lee et al. ................... 369/44.32 |
| 2005/0207303 | A1 * | 9/2005 | Yonezawa .................. 369/53.19 |
| 2009/0122323 | A1 * | 5/2009 | Schneider ..................... 356/616 |

FOREIGN PATENT DOCUMENTS

| JP | 04-351767 | 7/1992 |
|---|---|---|
| KR | 10-0207879 | 4/1999 |

* cited by examiner

*Primary Examiner* — Wayne Young
*Assistant Examiner* — Brenda Bernardi (57) ABSTRACT

An encoder is capable of being used to compensate for the tilting of a movable object in an apparatus. The encoder includes a fixed scale, and a movable scale integrated with an object that moves during an operation of the apparatus and having a plurality of patterns that are out of phase from each other with respect to the direction of movement of the object. The encoder may be employed by a hard disk drive (HDD) and a servo track recording apparatus. The movable scale is integrated with an actuator arm of the HDD for positioning a read/write head of the HDD, and the fixed scale is fixed to the housing of the HDD. The servo track recording apparatus can use the encoder to record servo track information precisely on a disk.

20 Claims, 9 Drawing Sheets

ENCODER CAPABLE OF COMPENSATING FOR TILT, HARD DISK DRIVE USING THE SAME, AND SERVO TRACK WRITING SYSTEM FOR THE HARD DISK DRIVE

PRIORITY STATEMENT

This application claims the benefit of Korean Patent Application No. 10-2009-0053491, filed on Jun. 16, 2009, in the Korean Intellectual Property Office.

BACKGROUND

The inventive concept relates to hard disk drives (HDD). More particularly, the inventive concept relates to a servo track writing system of a hard disk drive (HDD) and to the encoder of such a system.

An encoder is a device employed in various apparatus for measuring the movement or relative location of an object of the apparatus. To this end, a conventional encoder includes a light source, a first fixed grating, and a second grating connected to the object. Light emitted by the light source is transmitted through the first grating, and then is transmitted through or reflected by the second grating which is moving along with the object to which it is connected. The movement or relative location of the object is detected based on changes in the light transmitted by the two gratings. However, the accuracy of the encoder is often compromised due to backlash in the apparatus.

One apparatus that employs a conventional encoder of this type is a servo track writing system of an HDD. In a servo track writing system of an HDD, servo track information, by which a reading/writing head of the HDD can be moved rapidly and precisely to a desired position on the disk, is recorded in advance on servo tracks of the disk. This operation of recording the servo track information is referred to as servo track writing (STW). The encoder is used to track the location of the arm of the actuator which carries the reading/writing head in the STW operation. For example, the encoder may be connected to a pushpin which moves the actuator arm via a mechanical tool, and the amount of movement of the pushpin is detected to detect the movement of the actuator arm. However, backlash between the pushpin and the actuator, or vibrations and shocks generating during the STW operation may result in non-uniformity in the intervals between the servo tracks. Non-uniform intervals between the servo tracks prevents the disk from being able to have a high recording density, i.e., prevents the disk from being able to have a large number of tracks per inch (TPI).

SUMMARY

According to an aspect of the inventive concept, there is provided in apparatus having an object whose location and/or movement is to be tracked during an operation of the apparatus, an encoder having an optical axis and including a fixed scale that is disposed along the optical axis and a movable scale that is disposed along the optical axis and is integral with the object so as to move with the object relative to the fixed scale during the operation of the apparatus, wherein the movable scale is made up of a plurality of similar patterns out of phase from each other with respect to a direction of movement of the object. By pattern, it is meant an array of individual features repeated throughout the pattern.

According to another aspect of the inventive concept, there is provided a hard disk drive (HDD) comprising a housing, an actuator including an actuator arm disposed in the housing and supporting a reading/writing head, a movable scale integral with the actuator arm so as to move therewith, and a fixed scale fixed to the housing, wherein the movable scale comprises a plurality of patterns that are similar to each other, each of the patterns comprising an array of individual features, and the plurality of patterns being out of phase from each other with respect to a direction of movement of the actuator arm during a reading/writing operation of the HDD in which data is recorded on or reproduced from a disk in the housing.

According to still another aspect of the inventive concept there is provided a servo track recording apparatus comprising: a housing for accommodating a disk and having a window therein, an actuator including an actuator arm disposed in the housing and supporting a reading/writing head, a frame supporting the housing, an encoder including a movable scale integral with the actuator arm and a fixed scale fixed to the housing, and a servo controller. The encoder also includes a light source and a light detector mounted to the frame. The light source is positioned such that the light emitted therefrom propagates through the window of the housing and to the movable scale via the fixed scale. The servo controller is operatively connected to the actuator, the reading/writing head and the encoder and is configured to control the reading/writing head and the movement of the actuator arm based on signals from the encoder during the servo track writing operation.

BRIEF DESCRIPTION OF THE DRAWINGS

The inventive concept will be more clearly understood from the following detailed description of the preferred embodiments thereof made in conjunction with the accompanying drawings in which.

DETAILED DESCRIPTION OF THE PREFERRED EMBODIMENTS

The present inventive concept will now be described more fully with reference to the accompanying drawings. Like reference numerals denote like elements throughout the drawings. Thus, elements referred to a second time and designated by the same reference numeral as a previously described element will often times not be described again in detail in the specification.

Figure 1:
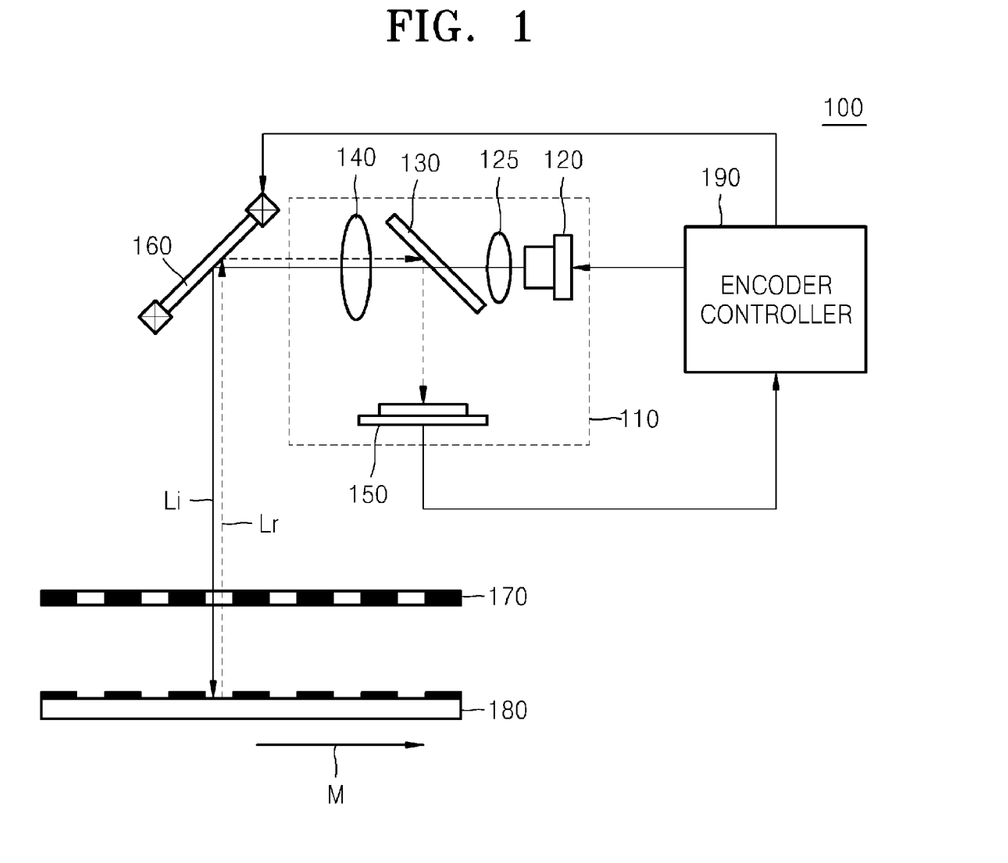
FIG. 1 is a block diagram of an embodiment of an encoder according to the present inventive concept.

Referring to FIG. 1, an embodiment of an encoder 100 according to the present inventive concept includes a light transmitting/receiving unit 110, a tilt compensating unit 160, a fixed scale 170, a movable scale 180, and an encoder controller 190. The encoder 100 is a reflective type which detects changes in the light reflected by the movable scale 180. The light transmitting/receiving unit 110 transmits/receives light Li and Lr along a fixed portion of the optical axis of the encoder.

The light transmitting/receiving unit 110 includes a light source 120, a beam splitter 130, a condensing lens 140, and a photodetector 150. The light transmitting/receiving unit 110 transmits light Li to the fixed scale 170, and receives light Lr reflected by the movable scale 180.

The light source 120 may be a semiconductor laser diode that emits laser beams. A collimating lens 125 may be provided in front of the light source 120 (downstream of the light source 120 with respect to the optical axis). In this case, the collimating lens 125 collimates the light Li emitted by the light source 120, i.e., converts the rays of the light Li to parallel light rays.

The beam splitter 130 divides the light Lr reflected from the movable scale 180 from the light Li emitted from the light source 120. One example of an optical device that is suitable for use as the beam splitter 130 is a half-mirror. Another example is a polarizing beam splitter such as a polarizer that polarizes the light or a quarter-wave plate that changes the direction of polarization of the light.

The condensing lens 140 focuses the light Li emitted from the light source 120 onto the movable scale 180. A driving unit (not shown) may be integrated with the condensing lens 140 for controlling the condensing lens 140 in order to focus the light such that a photodetection operation is carried out more accurately.

Figure 2:
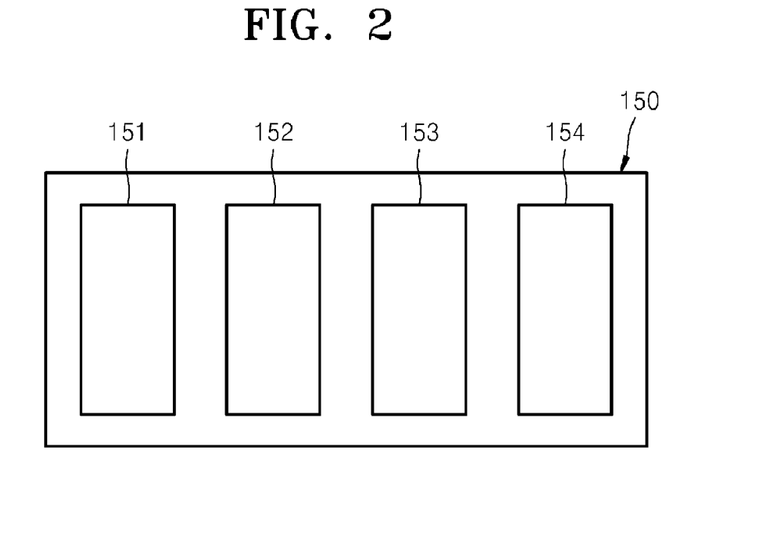
FIG. 2 is a plan view of an example of a photodetector of the encoder of FIG. 1.

The photodetector 150 is a photoelectric converter which receives pulses of the light Lr generated when the movable scale 180 is moving, and converts the pulses of received light Lr into electric pulses. The photodetector 150 may be an array of photodiodes corresponding in number to the number of patterns of the movable scale 180. For example, when the movable scale 180 includes four gratings patterns which are disposed in parallel, as will be described later, the photodetector 150 may include four photodiodes 151, 152, 153, and 154 as shown in FIG. 2.

The tilt compensating unit 160 compensates for any tilt between the fixed scale 170 and the movable scale 180. In this embodiment, the tilt compensating unit is a movable mirror 160. The movable mirror 160 is disposed along the optical axis of the encoder 100 between the fixed scale 170 and the light transmitting/receiving unit 110 and is operable to change the path of the light Li or Lr. That is, the tilt compensating unit 160 is operative to adjust a portion of the optical axis that extends to the movable scale 180 and hence, the angle at which the light Li is incident on the movable scale 180. Therefore, the movable mirror 160 may compensate for any tilting or skewing of the fixed scale 170 and the movable scale 180 relative to one another. To this end, the movable mirror 160 may include a reflective mirror and a driving unit which adjusts an angle at which incident light is reflected by the reflective mirror. The driving unit may be any well known device capable of changing the position of the reflective mirror such as those comprising an electromagnet, a piezoelectric element, or a source of electrostatic power.

The fixed scale 170 is disposed along the optical axis between the movable mirror 160 and a moving object (not shown in FIG. 1), and is fixed in position with respect to the moving object. In this respect, the fixed scale 170 may be fixed to a frame along with the light transmitting/receiving unit 110 and the movable mirror 160.

Figure 3:
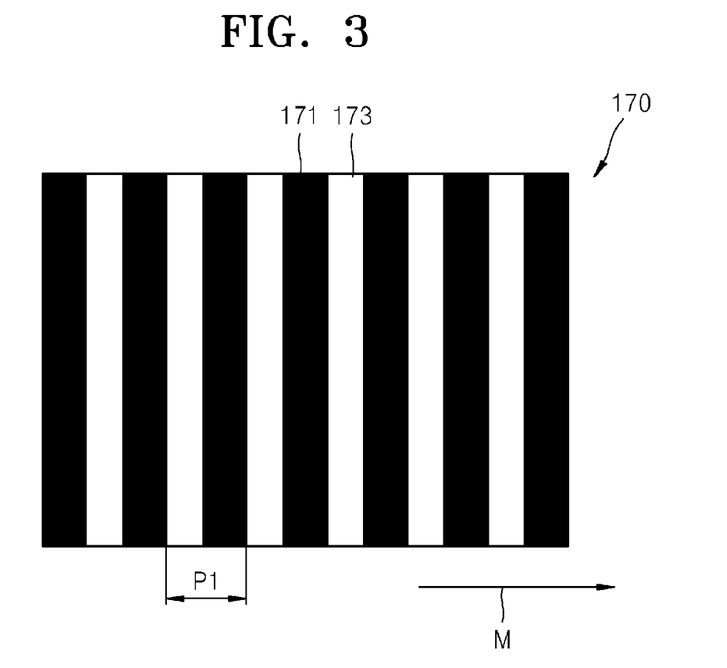
FIG. 3 is a diagram of a fixed scale pattern of the encoder of FIG. 1.

The fixed scale 170, as shown in FIG. 3, may be a grating in which a plurality of black (opaque) stripes 171 and a plurality of transparent regions 173 in the form of stripes are alternately arranged with a pitch P1. Also, the fixed scale 170 may be oriented such that the grating thereof is aligned in the direction M of movement of the moving object (not shown in FIG. 3). More specifically, the fixed scale 170 may be oriented such that direction in which the opaque stripes 171 of the grating alternate with the transparent regions 173 coincides with the direction M along which the moving object translates past the fixed scale 170.

The movable scale 180 is attached to the moving object, and includes a plurality of patterns having different phases from each other. In particular, the movable scale 180 may include a plurality of grating patterns which are disposed in parallel and each of which grating patterns is offset relative to the other grating patterns in the direction M of movement of the moving object. As will be described in more detail later on, the light reflected from the movable scale 180 can provide information about the movement or location of the movable object because the movable scale 180 is attached to and hence, moves with the movable object. In addition, signals produced from light reflecting from the plurality of gratings patterns, respectively, have different phases from each other, and the phases differ depending on the amount by which the fixed scale 170 and the movable scale 180 are tilted relative to one another. Therefore, the signals respectively produced from the light reflecting from the plurality of gating patterns of the movable scale 180 can be used to determine whether the fixed scale 170 and the movable scale 180 are tilted relative to one another.

An example of the movable scale 180 will now be described in more detail with reference to FIG. 4.

Figure 4:
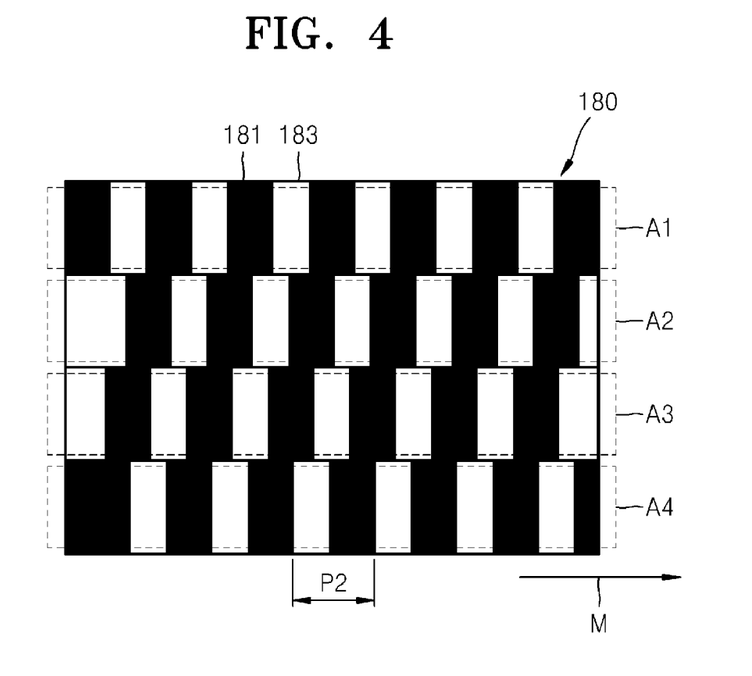
FIG. 4 is a diagram of a movable scale pattern of the encoder of FIG. 1.
Figure 5:
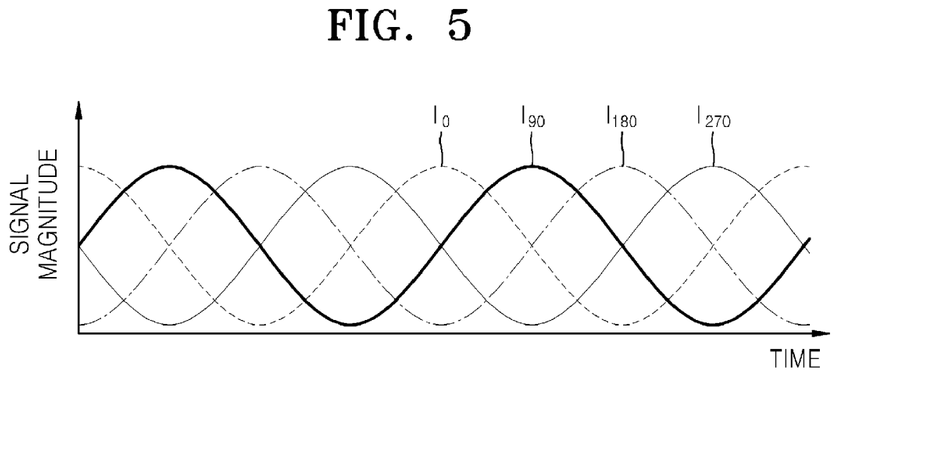
FIG. 5 is a graph showing the magnitudes of optical signals produced when light is reflected from patterns having different phases from each other in the movable scale shown in FIG. 4.

The movable scale 180 of this example includes four grating patterns A1, A2, A3, and A4 disposed parallel to each other in a direction perpendicular to the direction M of movement of the moving object (not shown in FIG. 4). Each of the four grating patterns A1, A2, A3, and A4 includes a plurality of black stripes 181 and a plurality of reflective regions 183 and wherein the black stripes 181 are alternately disposed with the reflective regions 183 with a pitch P2. That is, the distance between a leading edge of one of the reflective regions 183 and the trailing edge of the black stripe 181 adjacent thereto in a given direction, e.g., the direction of movement M, is P2. Furthermore, the pitch P2 of the movable scale 180 is equal to or greater than the pitch P1 of the fixed scale 170. Also, each of the four grating patterns A1, A2, A3, and A4 is out of phase by 90° with respect to one other of the grating patterns. For example, the four grating patterns A1, A2, A3, and A4 produce phase differences of 0°, 90°, 180°, and 270° in light incident thereon, respectively. Accordingly, the light reflected from the four grating patterns A1, A2, A3, and A4, as the moving object translates in the direction M, produces signals corresponding to the intensities $I_0$, $I_{90}$, $I_{180}$, $I_{270}$ of the light, respectively, as shown in FIG. 5. That is, these signals have phases of 0°, 90°, 180°, and 270°, respectively.

A method of determining the extent to which the fixed scale 170 and the movable scale 180 may be tilted relative to one another will now be described with reference to FIGS. 6 and 7.

Figure 6:
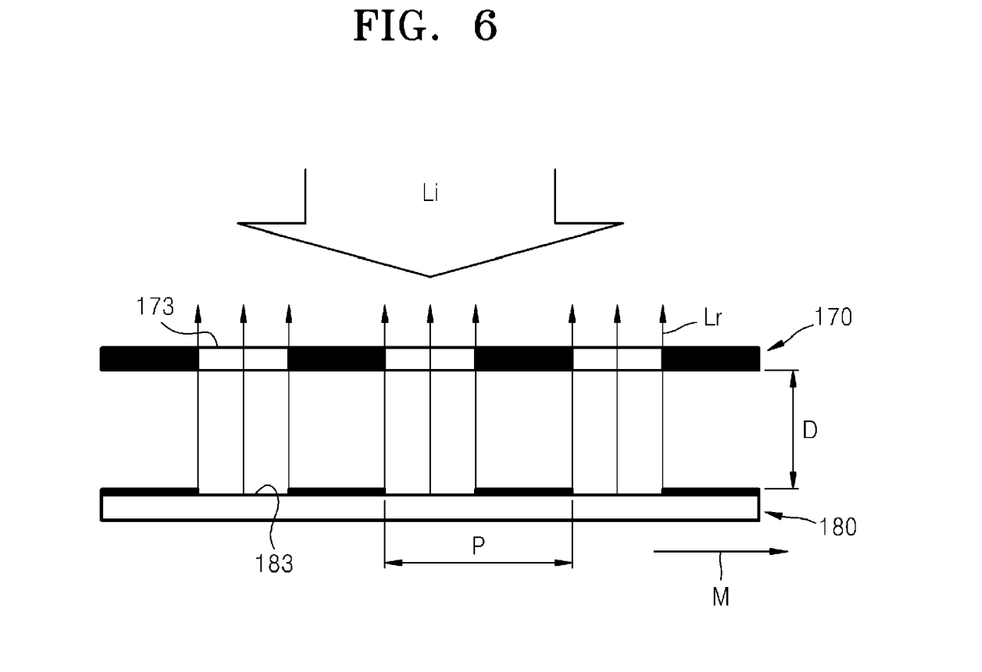
FIG. 6 is a diagram of the fixed scale and the movable scale in original positions in which the fixed scale and the movable scale are parallel to each other.
Figure 7:
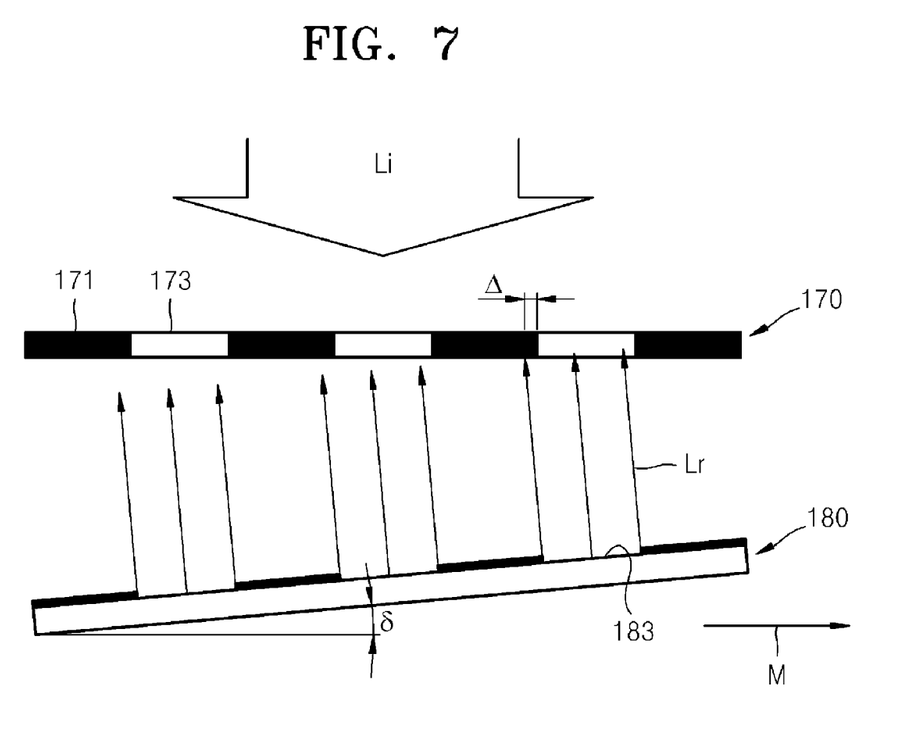
FIG. 7 is a diagram of the fixed scale and the movable scale showing a case in which the movable scale is tilted toward the fixed scale.

FIG. 6 shows the fixed scale 170 and the movable scale 180 in relative positions at which the fixed scale 170 and the movable scale 180 are parallel with each other, and FIG. 7 shows a case in which the movable scale 180 is tilted by an angle δ toward the fixed scale 170. In this example, the pitch of the pattern of the fixed scale 170 is the same as the pitch of each of the grating patterns of the movable scale 180. Also, the method explained below with reference to FIGS. 6 and 7 will be made with respect to the grating pattern A1 of the movable scale 180, as an example.

Referring to FIG. 6, light Li propagating perpendicular to the fixed scale 170 and incident thereon is transmitted by the transparent regions 173 of the fixed scale 170 and then, is incident on the movable scale 180. The light Lr reflected by the reflective regions 183 of the movable scale 180 passes back through the transparent regions 173 of the fixed scale 170, and subsequently propagates to the photodetector 150 (refer to FIG. 1). As a result, the optical signal received by the photodetector 150 will have the waveform of $I_0$ shown in the graph of FIG. 5 because the movable scale 180 is attached to the moving object and hence, moves in the direction M along with the object.

Referring to FIG. 7, the movable scale 180 can be come tilted toward the fixed scale 170 when, for example, the object to which the movable scale 180 is attached vibrates or when the object experiences an external shock. In this case, the light Lr reflected by the reflective regions 183 of the movable scale 180 propagates in a direction inclined by some angle of δ with respect to the normal of the fixed scale 170 and hence, part (Δ) of the reflected light Lr is blocked by the black stripes 171 of the fixed scale 170 and therefore is not detected by the photodetector 150 (refer to FIG. 1). Accordingly, the optical signal detected by the photodetector 150 is distorted and thus alone could not be used to accurately determine the movement or the relative location of the object. However, the movable scale 180 of the present embodiment includes the plurality of patterns that are out of phase with respect to each other so that the movement or the relative location of the object can be accurately determined despite the distortion of the optical signals due to a tilt in the movable scale 180.

For example, referring to FIGS. 4 and 5, assuming that $I_1=I_0+I_{180}$ and $I_2=I_{90}+I_{270}$ for the intensities $I_0$, $I_{90}$, $I_{180}$, $I_{270}$ of the optical signals detected from the four grating patterns A1, A2, A3, and A4, a signal having a magnitude of $I_1/I_2$ approximately has a normal waveform regardless of the angle at which the movable scale 180 is disposed relative to the fixed scale 170. Therefore, the intensities $I_0$, $I_{90}$, $I_{180}$, and $I_{270}$ of the optical signals detected by the photodetector 150 can be combined in such a way as to in effect remove any distortion of the optical signals due to a tilting of the movable scale 180. Thus, accurate information of the movement or relative location of the object can be obtained. Moreover, the angle at which the movable scale 180 is tilted relative to its normal position can be calculated from the sum of $I_1+I_2$. Therefore, the tilt of the movable scale 180 may be compensated for using the tilt compensating unit 160 (refer to FIG. 1).

Figure 8:
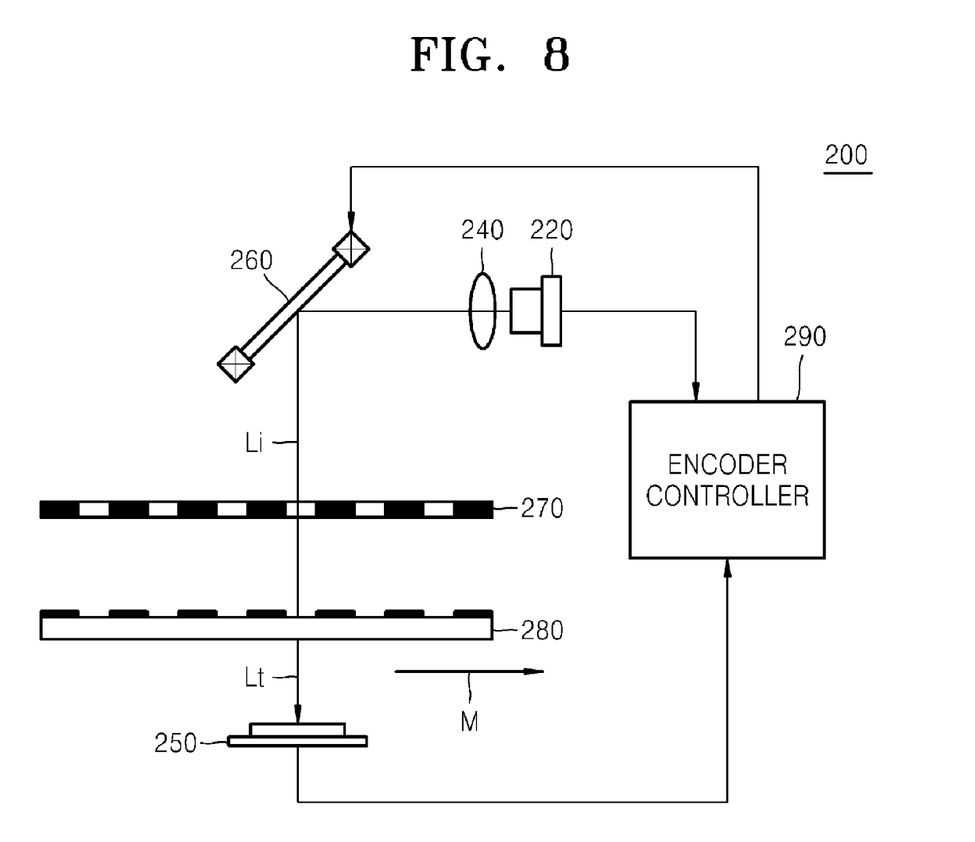
FIG. 8 is a block diagram of another embodiment of an encoder according to the present inventive concept.

FIG. 8 is a block diagram of another embodiment of an encoder 200 according to the present inventive concept.

Referring to FIG. 8, the encoder 200 includes a light transmitting/receiving unit, a tilt compensating unit 260 such as a movable mirror, a fixed scale 270, a movable scale 280, and an encoder controller 290. The encoder 200 of the present embodiment is different from the encoder 100 of the previous embodiment in that the encoder 200 is a transmissive type which detects changes in light transmitted through the fixed scale 270 and the movable scale 280.

The light transmitting/receiving unit includes a light source 220, a condensing lens 240, and a photodetector 250. The light source 220 and the condensing lens 240 are disposed to the side of the fixed scale 270 having an incident surface (i.e., upstream of the fixed scale 270 with respect to the optical axis of the encoder 200), and the photodetector 250 is disposed to the side of the movable scale 280 having an exit surface (i.e., downstream of the movable scale 270 with respect to the optical axis of the encoder 200). Thus, in the encoder 200 of the present embodiment, the light Li incident on and the light Lt transmitted by the movable scale 280 propagate along different paths. Accordingly, a beam splitter such as the half-mirror 130 of the encoder 100 of the previous embodiment is not necessary. The light source 220, the condensing lens 240, and the photodetector 250 are similar to those of the previous embodiment of FIG. 1 and accordingly, these components will not be described again in detail.

The tilt compensating unit 260 is disposed between the fixed scale 270 and the light source 220 to adjust the optical axis of the encoder 200 and in particular, the path along which the light Li emitted from the light source 220 propagates to the movable scale 280. Therefore, the tilt compensating unit 260 is operable to compensate for any skew that exists between the fixed scale 270 and the movable scale 280 as described above in connection with the previous embodiment In this embodiment as well, the tilt compensating unit 260 is a movable mirror operative to adjust the angle at which light is reflected. Also, in the present embodiment, the movable mirror 160 is disposed between the fixed scale 270 and the light source 220; however, the inventive concept is not so limited. Alternatively, the movable mirror may be disposed between the movable scale 280 and the photodetector 250.

The patterns of the fixed scale 270 and the movable scale 280 are similar to those of the previous embodiment of FIG. 1, and thus will not be described here in detail. However, unlike the movable scale 180 of the encoder 100 of the previous embodiment, the movable scale 280 is of a transmissive type in which the grating patterns each include transparent regions instead of the reflective regions 183. That is, each of the grating patterns of the movable scale 280 is made up of alternately disposed black stripes and transparent regions.

An embodiment of a hard disk drive (HDD) 300 according to the inventive concept will not be described with reference to FIGS. 9-14.

Figure 9:
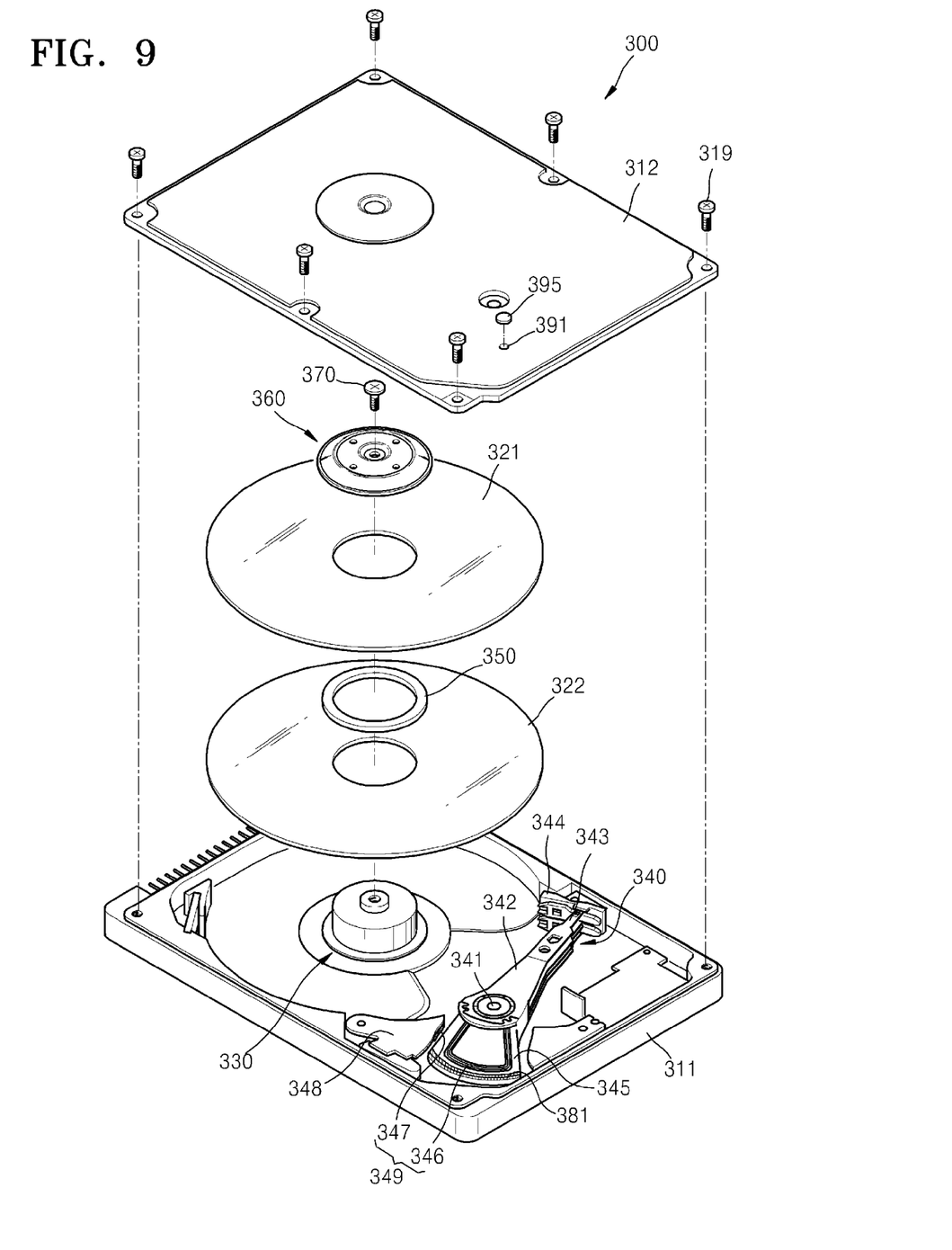
FIG. 9 is an exploded perspective view of an embodiment of a hard disk drive (HDD) according to the present inventive concept.

The HDD 300 includes a housing 310 which accommodates one or more disks for storing data. The housing 310 consists of a base member 311 and a cover member 312. The base member 311 and the cover member 312 are coupled to each other with a plurality of screws 319 to provide a sealed space therebetween. The HDD 300 also includes spindle motor 330 for rotating the disk(s) and an actuator 340 for moving a respective reading/writing head for recording or reproducing data on or from a predetermined location on each disk are installed in the housing 310.

The spindle motor 330 is installed on the base member 311. As shown in FIG. 9, two disks 321 and 322 are mounted on the spindle motor 330. In this case, i.e., in the case in which a plurality of disks are mounted on the spindle motor 330, a respective ring-shaped spacer 350 is disposed between adjacent ones of the disks to maintain a gap between the disks. In addition, a clamp 360 for fixing the disks 321 and 322 firmly on the spindle motor 330 is coupled to an upper end portion of the spindle motor 330 with a screw 370.

The actuator 340 includes a pivot 341 disposed on the base member 311, an actuator arm 342 supported by the pivot 341 so as to be rotatable about an axis of rotation, and a suspension assembly 343 disposed on a front portion of the actuator arm 342. A reading/writing head is integrated with the suspension assembly 343 so as to be elastically biased toward surfaces of the disks 321 and 322 by the suspension assembly 343.

The HDD 300 also includes a voice coil motor (VCM) 349 that rotates the actuator arm 342. The VCM 349 includes a VCM coil 346 integrated with a rear end portion of the actuator arm 342, that is, an over mold 345, and a magnet 347 facing the VCM coil 346. The magnet 347 is attached to a yoke 348 which is coupled to the base member 311. The VCM 349 is controlled by a servo control system, and the actuator 340 is rotated in a direction according to Fleming's left hand rule by an interaction between electric current supplied to the VCM coil 346 and the magnetic field generated by the magnet 347. More specifically, when the HDD 300 is turned on and the disks 321 and 322 start to rotate, the VCM 349 rotates the actuator arm 342 in a counter-clockwise direction to move the reading/writing head over recording surfaces of the disks 321 and 322. On the other hand, when the HDD 300 is turned off and the disks 321 and 322 stop rotating, the VCM 349 rotates the actuator arm 342 in a clockwise direction to remove the reading/writing head from the disks 321 and 322 and park the reading/writing head on a parking ramp 344 which is disposed radially outwardly of the disks 321 and 322.

Figure 10:
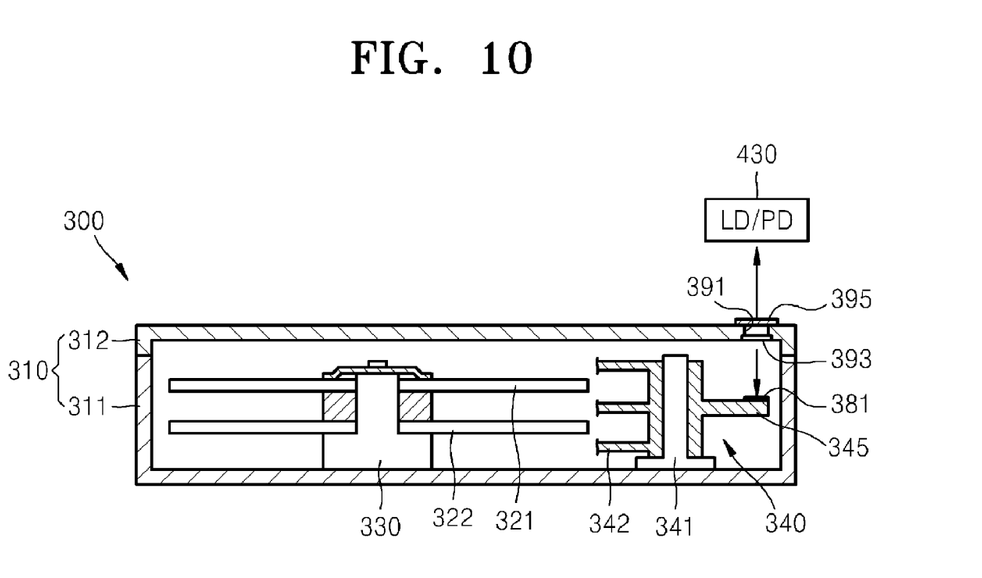
FIG. 10 is a cross-sectional view of the HDD of FIG. 9.

Servo track information recorded on the surfaces of the disks 321 and 322 in advance is used to rapidly and precisely position the reading/writing head at a desired location over the disks 321 and 322. For this purpose, the HDD 300 of the present embodiment movable scale 381 and a fixed scale 395 of an encoder 430 (FIG. 10).

Figure 11:
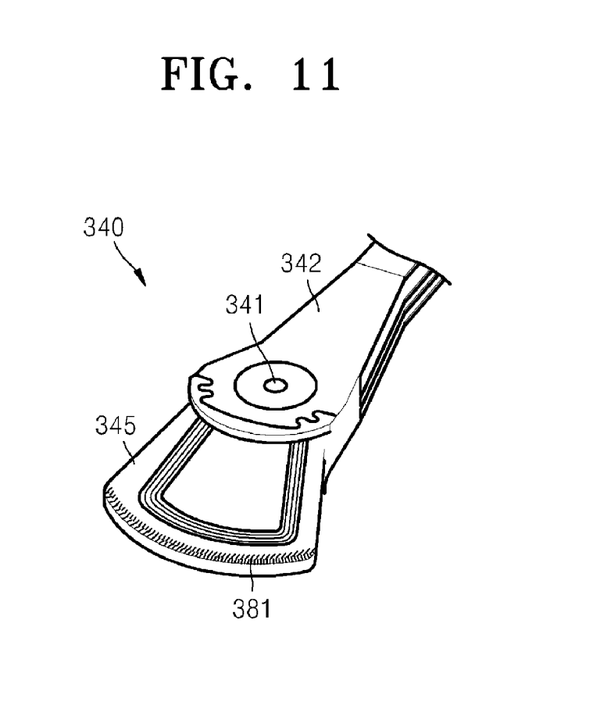
FIG. 11 is an enlarged view of a portion of the actuator of the HDD of FIG. 9 on which the movable scale of the encoder of the HDD is provided.

Referring to FIG. 11, the movable scale 381 may be disposed at the rear end portion of the actuator arm 342 and in particular, along an upper outer edge of the over mold 345. The rear end portion of the actuator arm 342 moves along an arcuate path because the actuator 340 is supported to rotate about an axis of the pivot 341. Therefore, the movable scale 381 extends along a circular arc whose radius extends from the axis of rotation of the actuator arm 343 (the axis of the pivot 341). The patterns of the movable scale 381 are similar to those of the movable scale 180. That is, the movable scale 381 may include a plurality of patterns that are out of phase from each other, e.g., the movable scale 381 may include grating patterns similar to the grating patterns A1, A2, A3 and A4 shown in FIG. 4. The patterns may be etched by a laser into the actuator arm 342 or may be provided on tape attached to the actuator arm 342.

Figure 12:
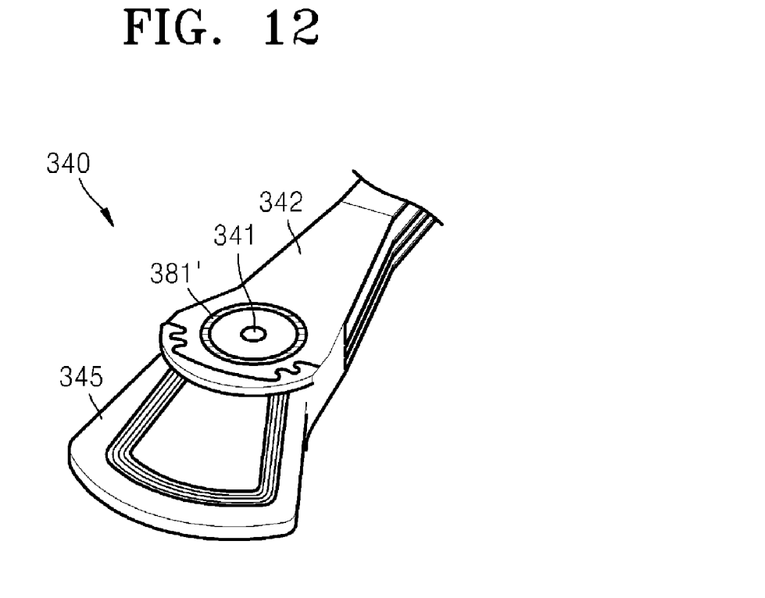
FIGS. 12 and 13 are enlarged views of other examples of actuators that may be employed in the HDD of FIG. 9, respectively.
Figure 13:
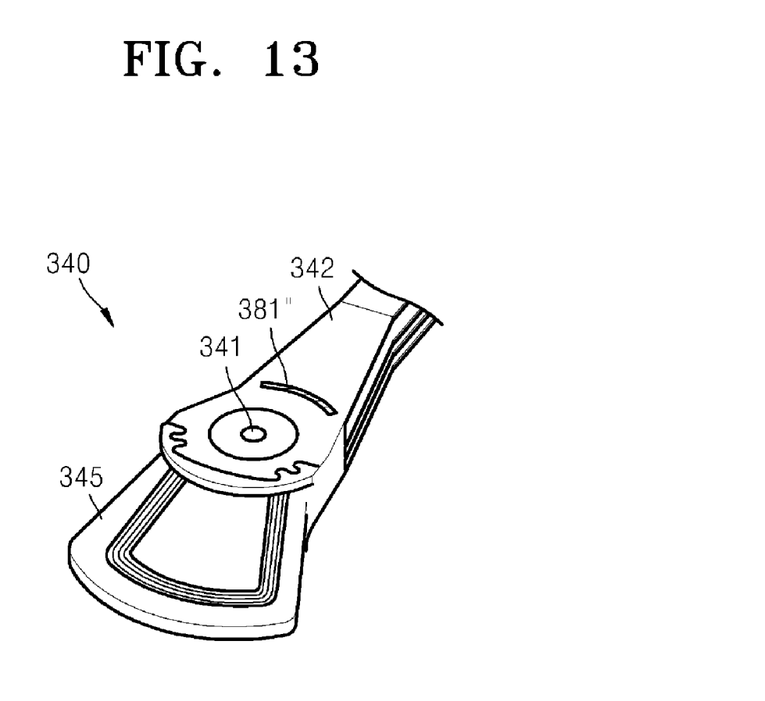

The inventive concept is not limited to an encoder in which the movable scale 381 is disposed along an upper outer edge of the over mold 34. For example, as an alternative and as shown in FIG. 12, the movable scale 381' of the encoder may be disposed on the actuator arm 342 around the pivot 341. In this example, the grating patterns are concentric about the axis of rotation of the actuator arm 342. As another alternative as shown in FIG. 13, the movable scale 381" may be in the form of an arc disposed on an intermediate portion of the actuator arm 342 located between the pivot 341 and the suspension assembly and whose radius extends from the axis of the pivot 341.

The housing 310 includes a window 391 juxtaposed with the movable scale 381. A laser beam emitted from a light source of the encoder 430 is transmitted through the window 391. The fixed scale 395 of the encoder 430 may be attached to the housing 310 so as to extend across the window 391. In this case, the fixed scale 395 may be constituted by a tape or a thin film. Also, the window 391 may be a mere opening extending through the cover 312. In this case, the fixed scale 395 may cover the window 391 in such a way as to seal the cover member 312 and thereby seal off the inside of the housing 310. In any case, the pattern of the fixed scale 395 is similar to the pattern of the fixed scale 170 described above but has a shape conforming to that of the movable scale 381. For example, the pattern of the fixed scale 395 may extend along an arc or a circle.

Figure 14:
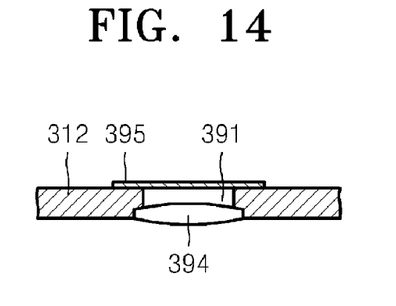
FIG. 14 is a cross-sectional view of another example of a window that may be employed in the HDD of FIG. 9.

A light transmission member is installed in the window 391. The light transmission member 393 seals the housing 310 while the laser beam is transmitted through the window 391. The light transmission member may be a flat piece of glass 393. Also, an inner surface of the light transmission member and the inner surface of the cover member 312 may be flush with each other so that the light transmission member 393 does not to interfere with the air flow around the disks 321 and 322. Instead of the flat piece of glass 393 shown in FIG. 10, the light transmission member may be a lens 394, as shown in FIG. 14, which focuses the laser beam onto the movable scale 381.

Furthermore, in the present embodiment, the fixed scale 395 is disposed on the outer surface of the cover 312; however, the present inventive concept is not limited thereto. Rather, for example, the fixed scale 395 may be formed on an outer surface or an inner surface of the light transmission member.

Likewise, in the examples of the present embodiment described above, the movable scale 381 is integrated with an upper surface of the actuator 340, and the window 391 is formed in the cover 312 of the housing 310 at a location below which the movable scale 381 is located. However, the inventive concept is not so limited. For example, the window 391 may be provided in the base member 311 of the housing 310 and in this case, the movable scale 381 is integrated with a lower surface of the actuator arm 342.

Figure 15:
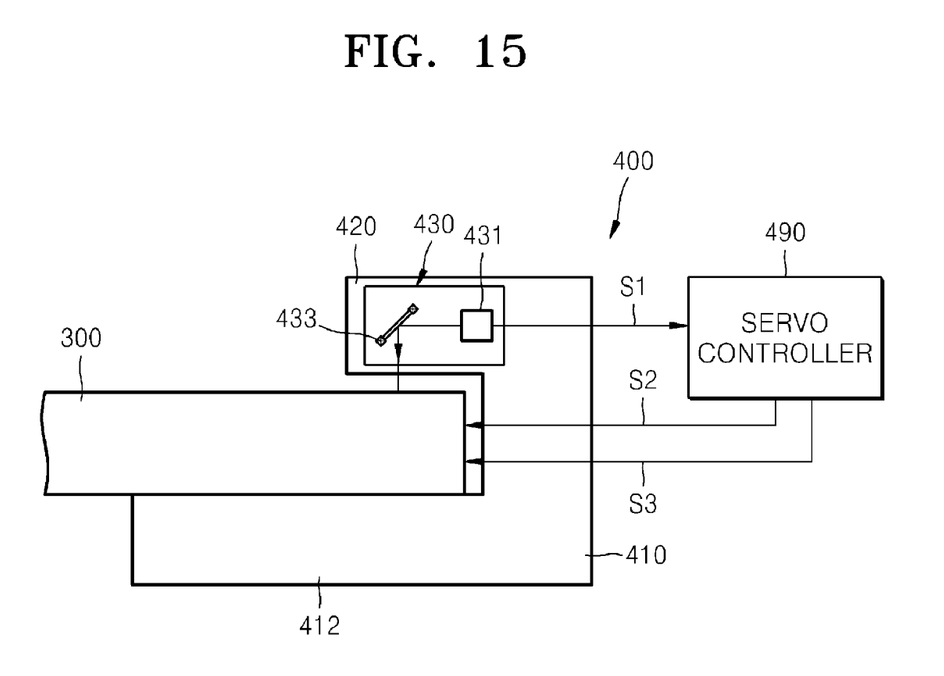
FIG. 15 is a block diagram of an embodiment of a servo track recording apparatus according to the present inventive concept.

FIG. 15 is a schematic diagram of a servo track recording apparatus 400, having an encoder 430, according to the present inventive concept.

Referring to FIG. 15, the servo track recording apparatus 400 includes an HDD 300 similar to that shown in and described with reference to FIG. 9), a frame 410, and a servo controller 490. The servo track recording apparatus 400 records the servo track information on the surfaces of the (such as disks 321 and 322 in FIG. 9) mounted in the HDD 300.

The frame 410 supports components (optical and electrical, for example) of the servo track recording apparatus 400, and may include a base 412 supporting the HDD 300, and an arm 420 integral with and extending from the base 412. The arm 420 extends over the HDD 300 to support components of the encoder 430 as will be described in more detail below.

The encoder 430 detects locations of the actuator 340 of the HDD 300 and in this regard, the encoder 430 may be similar to either of the encoders 100 and 200 described above. More specifically, the encoder 430 includes a movable scale integrated with the actuator arm 342 of the actuator of the HDD 300 (refer to FIGS. 9-13 for examples), a fixed scale fixed to the housing of the HDD (e.g., to the cover of the housing as shown in and described above in connection with FIGS. 9, 10 and 14), a light transmitting/receiving unit 431 (comprising a light source and a light detector) which transmits the light L to the movable scale and the fixed scale and receives the light L transmitted from the movable scale, a tilt compensation unit 433 disposed along that part of the optical axis of the encoder and operative to compensate for any tilting of the movable scale relative to the fixed scale, and an encoder controller for controlling the tilt compensation unit 433. The light transmitting/receiving unit 431 may be similar to the light transmitting/receiving unit 110 described with reference to FIG. 1. The tilt compensation unit 433 may include a movable mirror as was also described with reference to FIG. 1. The encoder controller is similar to the controller encoder 190 shown in and described with reference to FIG. 1. Therefore, the encoder controller controls the light transmitting/receiving unit 431, detects any tilting of the movable scale relative to the fixed scale from the signals generated by the light transmitting/receiving unit 431 based on the sets of optical pulses reflected from the patterns of the movable scale, respectively, and compensates for such tilting by driving the tilt compensation unit 433. The encoder controller may be an integral part of the servo controller 490 of the servo track recording apparatus 400 or a component that is separate and independent of the servo controller 490.

The remainder of the basic operation of the encoder 430 is essentially the same as that described in connection with FIGS. 1-10 and therefore, will not be described again detail. Furthermore, in the apparatus shown in FIG. 15, the optical pulses, providing the information on the location of the actuator of the HDD 330, received by the light receiving/transmitting unit 431 of the encoder 430 are converted into electric pulses constituting a location signal S1. The location signal S1 is by the transmitted by the encoder 430 to the servo controller 490.

On the basis of the location signal S1, the servo controller 490 generates a location control signal S2 that controls the location of the actuator and a signal S3 about the servo track information which will be recorded on the disks of the HDD 300. More specifically, the location control signal S2 is transmitted to the VCM of the actuator of the HDD 300 to control the location of the actuator arm, and the signal S3 is transmitted to the reading/writing head of the actuator. Accordingly, the reading/writing head records the servo track information at precisely the desired locations on the surfaces of the disks.

In this way, the encoder 430 can also reduce fine errors in the movement of the actuator arm due to disturbances when the servo track information is recorded. In this respect, the servo track recording apparatus 400 of the present embodiment includes the tilt compensation unit 433 of the encoder 430. Therefore, the servo track recording apparatus 400 can provide a closed loop control which removes errors occurring in a case in which the actuator of the HDD experiences disturbances that cause the actuator arm of the actuator to become tilted, i.e., which cause the movable scale to become tilted relative to the fixed scale 395.

As described above, an encoder embodied according to the inventive concept includes a movable scale having the plurality of patterns that are out of phase from each other in the direction of movement of the object to which the movable scale is integrated. Thus, any tilting of the object, i.e., any tilting of the movable scale relative to the fixed scale can be detected and quantified. In addition, an encoder embodied according to the inventive concept may include a tilt compensating unit such as a movable mirror in a closed loop control for removing errors in the signals produced by the encoder which would other occur due to a tilting of the object form its normal or calibrated position due to some disturbance. Accordingly, an encoder embodied according to the inventive concept can measure the movement or determine the relative location of the object precisely.

Furthermore, in an HDD embodied according to the inventive concept, the movable scale is disposed directly on the actuator arm which supports and moves the reading/writing head of the HDD, and the fixed scale is disposed on the housing of the HDD. Therefore, fine movements of the actuator arm can be detected. In addition, an HDD integrated with an encoder according to the inventive concept, the housing of the HDD does not have any large holes therein; thus, the housing can remain relatively rigid and highly shock resistant. Furthermore still, the does not have to be disassembled to correct for errors caused by shocks or other disturbances to the actuator.

According to still another aspect of the inventive concept, the movable scale and the fixed scale are located in the housing of the HDD so that a servo track writing (STW) operation may be performed in a state in which the HDD is sealed. Therefore, the STW operation does not have to be performed in a cleanroom. Thus, processing costs may be minimized. In addition, a servo track recording apparatus embodied according to the inventive concept may have a structure which is simpler than that of the conventional off-line servo track recording apparatus which includes an additional spindle motor and a positioner. Thus, servo track writing apparatus embodied according to the inventive concept is lest costly than conventional off-line servo track recording apparatus.

In addition, a servo track recording apparatus embodied according to the inventive concept can use the encoder to remove errors produced due to vibrations or shock so that an STW operation can be performed with high accuracy and data can be recorded with a high density. Therefore, the inventive concept allows disks having a large number of tracks per inch (TPI) to be used in a hard disk drive.

Finally, embodiments of the inventive concept have been described above in detail. The inventive concept may, however, be embodied in many different forms and should not be construed as being limited to the embodiments described above. Rather, these embodiments were described so that this disclosure is thorough and complete, and fully conveys the inventive concept to those skilled in the art. Thus, the true spirit and scope of the inventive concept is not limited by the embodiments described above but by the following claims.

What is claimed is:

1. Apparatus comprising an object that moves during an operation of the apparatus, and an encoder having an optical axis and including a fixed scale that is disposed along the optical axis and a movable scale that is disposed along the optical axis and is integral with the object so as to move with the object relative to the fixed scale during said operation of the apparatus, wherein the movable scale comprises a plurality of patterns that are similar to each other, each of the patterns comprising an array of individual features, and the plurality of patterns being out of phase from each other with respect to a direction of movement of the object during said operation.

2. The apparatus of claim 1, wherein each of the patterns of the movable scale is a pattern of features repeated along a row, and the rows are disposed parallel to one another with the features of each pattern being offset, in the direction of movement of the object, from the features of each of the other patterns of the movable scale.

3. The apparatus of claim 1, wherein the encoder further comprises:
a light transmitting/receiving unit that transmits light along the optical axis to the fixed scale and the movable scale and receives the light transmitted from the movable scale along the optical axis;
a tilt compensation unit disposed along the optical axis and controllable to adjust the optical axis of the encoder, whereby a tilting of the movable scale relative to the fixed scale can be compensated for; and
an encoder controller operatively connected to the tilt compensation unit to control the tilt compensation unit.

4. The apparatus of claim 3, wherein the tilt compensation unit comprises a movable mirror having a reflective surface, the inclination of which can be adjusted.

5. The apparatus of claim 3, wherein the light transmitting/receiving unit comprises:
a light source that emits the light which is transmitted to the fixed scale and the movable scale; and
a photodetector that receives the light transmitted from the movable scale and outputs signals having phases corresponding to the phases of the light transmitted from the patterns of the movable scale, respectively, and
wherein the encoder controller is configured to determine a tilting of the movable scale relative to the fixed scale from the signals output by the photodetector, and is operative to compensate for the tilting by driving the tilt compensation unit.

6. The apparatus of claim 1, wherein the movable scale is a grating pattern of transparent and opaque features alternately disposed in said direction of movement of the movable object.

7. The apparatus of claim 6, wherein each of the patterns of the movable scale is a grating pattern of transparent and opaque features alternately disposed along a row, and the rows are disposed parallel to one another with the transparent features of each pattern of the movable scale being offset, in said direction of movement of the object, from the transparent features of each of the other grating patterns of the movable scale.

8. A hard disk drive (HDD) comprising:
a housing;
an actuator including an actuator arm supporting a reading/writing head that records or reproduces data on or from a disk in the housing, the actuator arm being disposed in the housing and supported so as to be movable in a direction during a reading/writing operation in which data is recorded on or reproduced from a disk in the housing;
a movable scale integral with the actuator arm so as to move therewith, wherein the movable scale comprises a plurality of patterns that are similar to each other, each of the patterns comprising an array of individual features, and the plurality of patterns being out of phase from each other with respect to a direction of movement of the actuator arm during the reading/writing operation; and
a fixed scale fixed to the housing.

9. The HDD of claim 8, wherein each of the patterns of the movable scale is a pattern of features repeated along a row, and the rows are disposed parallel to one another with the features of each pattern being offset, in the direction of movement of the object, from the features of each of the other patterns of the movable scale.

10. The HDD of claim 8, wherein the actuator also includes a pivot on the housing, the actuator arm being supported by the pivot so as to be rotatable about an axis of the pivot, and a voice coil motor (VCM) that rotates the actuator arm about the axis, and the movable scale is located on the actuator arm and has the form of an arc or a circle whose radius extends from the axis.

11. The HDD of claim 8, wherein the movable scale is a grating pattern of transparent and opaque features alternately disposed in said direction of movement of the actuator arm.

12. The HDD of claim 11, wherein each of the patterns of the movable scale is a grating pattern of transparent and opaque features alternately disposed along a row, and the rows are disposed parallel to one another with the transparent features of each pattern of the movable scale being offset, in said direction of movement of the actuator arm, from the transparent features of each of the other grating patterns of the movable scale.

13. A servo track recording apparatus that records servo track information on a data storage disk, the apparatus comprising:
a housing for accommodating the disk, the housing having a window therein;
an actuator including an actuator arm supporting a reading/writing head that records or reproduces data on or from a disk in the housing, the actuator arm being disposed in the housing and supported so as to be movable in a direction in the housing;
a frame supporting the housing;
an encoder having an optical axis and including:
a movable scale disposed along the optical axis and integral with the actuator arm so as to move with the actuator arm, wherein the movable scale comprises a plurality of patterns, the plurality of patterns being out of phase from each other with respect to the direction of movement of the actuator arm,
a fixed scale disposed along the optical axis and fixed to the housing, and
a light source and a light detector mounted to the frame, the light source being positioned such that the light emitted therefrom propagates along the optical axis through the window of the housing; and
a servo controller operatively connected to the actuator, the reading/writing head and the encoder and configured to control the reading/writing head and the movement of the actuator arm based on signals from the encoder during the servo track writing operation.

14. The servo track recording apparatus of claim 13, wherein the plurality of patterns of the movable scale are a plurality of grating patterns disposed parallel to one another and offset from each other in the direction of movement of the actuator arm.

15. The servo track recording apparatus of claim 13, wherein the actuator also includes a pivot on the housing, the actuator arm being supported by the pivot so as to be rotatable about an axis of the pivot, and a voice coil motor (VCM) that rotates the actuator arm about the axis, and the movable scale is located on the actuator arm and has the form of an arc or a circle whose radius extends from the axis.

16. The servo track recording apparatus of claim 13, wherein the encoder also includes:
a tilt compensation unit disposed along the optical axis and controllable to adjust the optical axis of the encoder, whereby a tilting of the movable scale relative to the fixed scale can be compensated for; and
an encoder controller operatively connected to the tilt compensation unit to control the tilt compensation unit.

17. The servo track recording apparatus of claim 13, wherein the movable scale is a grating of transparent and opaque features alternately disposed in the direction of movement of the actuator arm.

18. The servo track recording apparatus of claim 17, wherein each of the patterns of the movable scale is a grating pattern of transparent and opaque features alternately disposed along a row, and the rows are disposed parallel to one another with the transparent features of each pattern of the movable scale being offset, in said direction of movement of the actuator arm, from the transparent features of each of the other grating patterns of the movable scale.

19. The apparatus of claim 1, wherein each of the patterns of the movable scale comprises an array of opaque and non-opaque features, the opaque features of each pattern are alternately disposed with the non-opaque features thereof in the direction of movement, and the patterns are disposed adjacent one another in a second direction perpendicular to the direction of movement, such that at least part of each opaque feature of each of the patterns is aligned in the second direction with at least part of a non-opaque feature of the pattern adjacent thereto.

20. The HDD of claim 8, wherein each of the patterns of the movable scale comprises an array of opaque and non-opaque features, the opaque features of each pattern are alternately disposed with the non-opaque features thereof in the direction of movement, and the patterns are disposed adjacent one another in a second direction perpendicular to the direction of movement, such that at least part of each opaque feature of each of the patterns is aligned in the second direction with at least part of a non-opaque feature of the pattern adjacent thereto.

* * * * *